United States Patent
Kump

Patent Number: 6,025,088
Date of Patent: Feb. 15, 2000

[54] LEAD-ACID BATTERY DESIGNED TO READILY RECEIVE CHARGING LEADS

[75] Inventor: William H. Kump, St. Paul, Minn.

[73] Assignee: GNB Technologies, Inc., Mendota Heights, Minn.

[21] Appl. No.: 08/961,623

[22] Filed: Oct. 31, 1997

[51] Int. Cl.[7] ................................................. H01M 2/30
[52] U.S. Cl. .................... 429/121; 429/123; 429/179; 439/755; 439/883
[58] Field of Search .................................. 429/179, 178, 429/121, 123; 439/754, 755, 859, 883

[56] References Cited

U.S. PATENT DOCUMENTS

| | | | |
|---|---|---|---|
| 2,132,793 | 11/1938 | Kyle | 136/135 |
| 2,291,674 | 8/1942 | Alden . | |
| 3,605,065 | 9/1971 | Shannon | 339/28 R |
| 3,711,335 | 1/1973 | Daniel | 136/135 S |
| 3,728,669 | 4/1973 | Churla . | |
| 3,745,516 | 7/1973 | Lieberman | 429/121 X |
| 3,783,439 | 1/1974 | Valentino | 339/234 |
| 4,263,379 | 4/1981 | Channing et al. | 429/179 |
| 4,351,890 | 9/1982 | Oxenreider | 429/179 |
| 4,377,317 | 3/1983 | Shekel et al. | 429/121 X |
| 4,435,486 | 3/1984 | Pomaro et al. | 429/179 X |
| 4,729,934 | 3/1988 | Krystaszek | 429/179 |
| 4,932,896 | 6/1990 | Julian | 439/504 |
| 5,013,259 | 5/1991 | Maurer | 439/522 |
| 5,071,368 | 12/1991 | Garritano et al. | 439/504 |
| 5,167,529 | 12/1992 | Verge | 439/504 |
| 5,662,504 | 9/1997 | Krivec | 439/857 |

*Primary Examiner*—Stephen Kalafut
*Attorney, Agent, or Firm*—Leydig, Voit & Mayer, Ltd.

[57] ABSTRACT

A lead-acid batteries having terminals designed to readily receive charging leads. The battery terminal and the charging cable lead utilize complementary configurations which interlock and provide an intimate and reliable connection between the terminal and lead. More specifically, an interlocking connection formed by a lead having two parallel legs which slide into slots formed in the wall of the side terminal has proven particularly effective. The interlocking terminal-lead connections eliminate the need of threadingly engaging and disengaging fasteners or adapters during charging that are normally necessary for side terminal batteries.

18 Claims, 3 Drawing Sheets

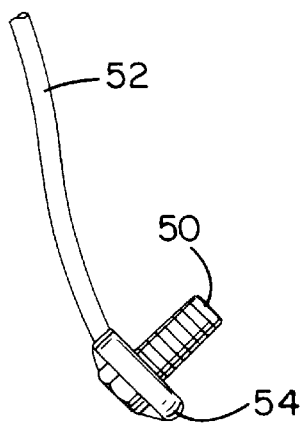
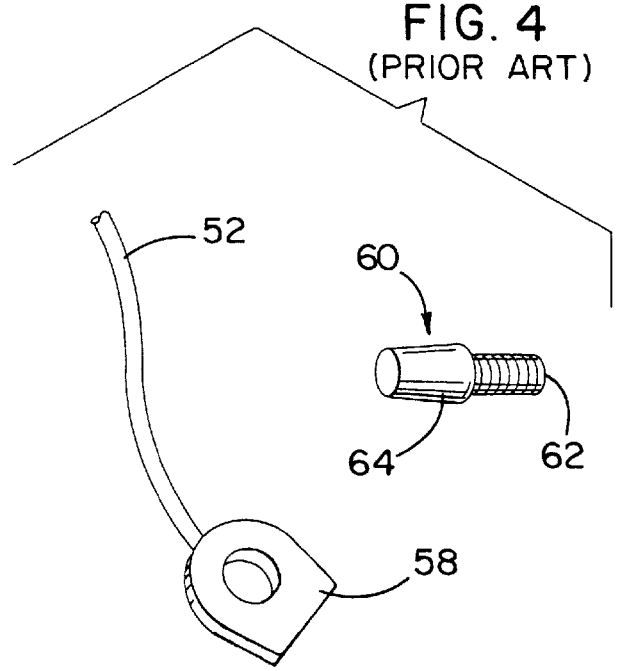
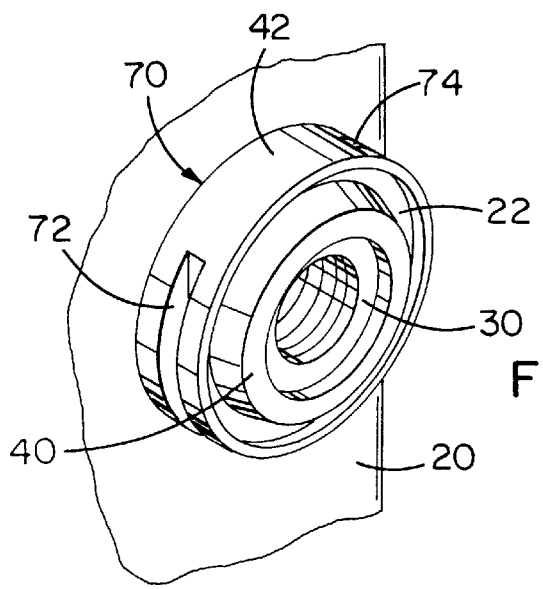
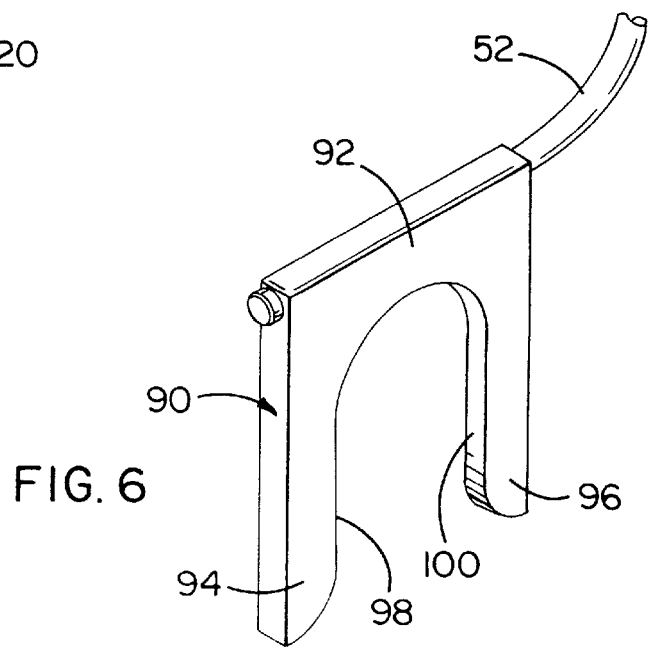

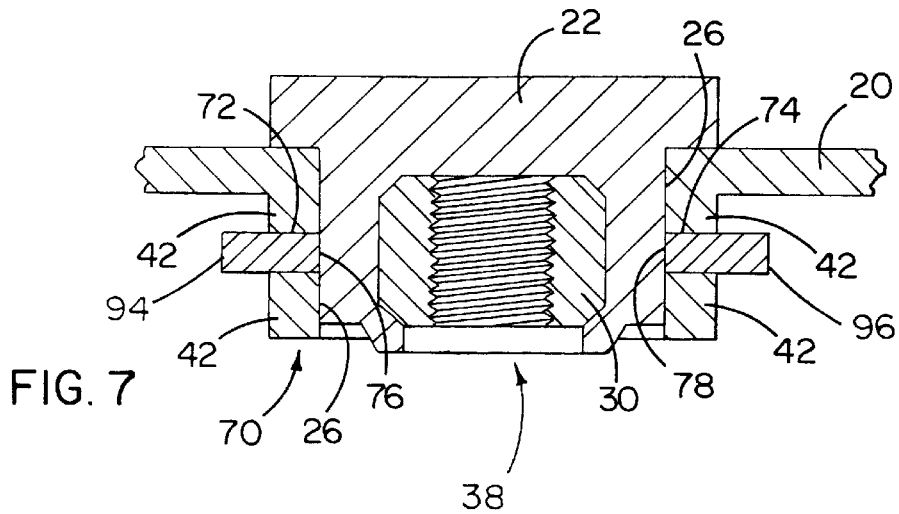
FIG. 7
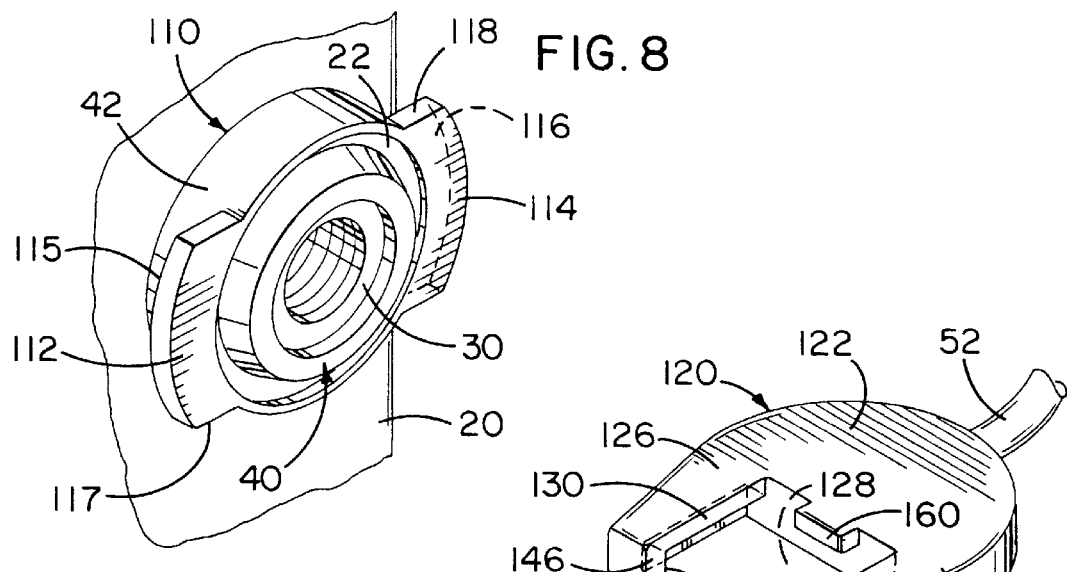
FIG. 8
FIG. 9
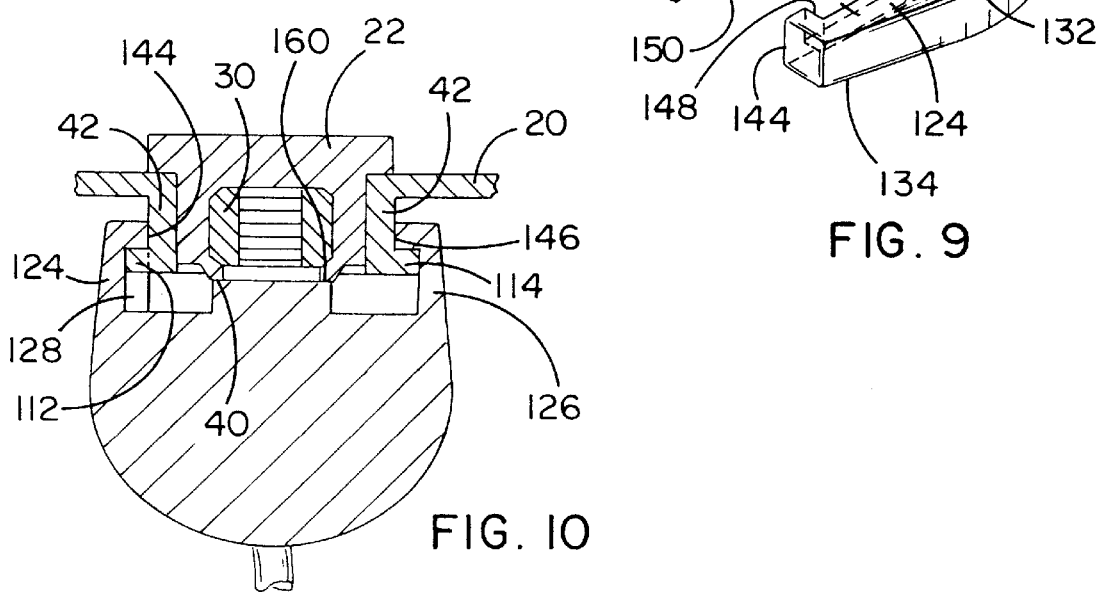
FIG. 10

LEAD-ACID BATTERY DESIGNED TO READILY RECEIVE CHARGING LEADS

FIELD OF THE INVENTION

The present invention relates to lead-acid batteries and, more particularly, to a battery that is designed to readily receive charging leads.

BACKGROUND OF THE INVENTION

Traditionally, lead-acid batteries for starting, lighting, and ignition ("SLI") automobiles and other vehicles have utilized top terminals. The necessary electrical formation of these batteries after assembly is straightforward. Thus, the upstanding top terminal posts can be readily attached to the formation/charging equipment by leads having clamps. Attachment and detachment of the lead to, and from, the battery posts is not that labor intensive, even considering the large number of batteries resulting from current automobile battery production lines.

However, one automobile manufacturer has for many years made automobiles which require alternative terminal configuration. More particularly, such batteries, commonly termed "side terminal batteries", have the terminals located on a front side wall of the battery container, typically being located below the level of electrolyte in the battery.

For this reason, as well as under-the-hood spatial considerations and other reasons, the configuration of the side terminals is different from that of the top terminal posts. Moreover, many different configurations have been used, among other reasons, due to the need to have an electrolyte-tight side terminal (i.e. adequate resistance to electrolyte leaking through or around the side terminal).

In general, such side terminals are located on the front side wall of the container in which a threaded terminal was positioned, desirably assembled so that the interface between the collar and the threaded terminal was electrolyte-tight. Usually, the threaded side terminal consisted of a cast or fused lead alloy part having an insert threaded to accept the battery cables of the automobile.

The formation of side terminal batteries is extremely cumbersome and labor intensive. Specifically, the charging cables typically employ a post clamp lead, as is used with traditional top post terminal batteries. Since such post clamp leads cannot be directly attached to the side terminals, adapters are commonly used to permit formation with the traditional post clamp leads. Such adapters typically employ a threaded shaft on one end to engage the side terminal and a post terminal connection on the opposite end to correspond with the post clamp lead. After threading the adapters into the side terminals, the standard battery charging cables having post clamp leads may be utilized. Adaptation of the side terminals requires threading into each battery's side terminal an adapter which must be subsequently removed after charging. Additionally, during production, the post clamp lead is usually placed over the tapered post terminal adapter to create an interference or friction fit. The resulting electrical connection between the post terminal adapter and the post clamp lead is often loose and results in a high resistance connection that may melt and distort the terminal.

The result is that the formation of side terminal batteries is not only laborious but also may be somewhat ineffective. Given the large number of batteries involved in the typical commercial line, this is a significant problem. Yet, this less than desirable situation has endured for many years. There accordingly exists a clear need for a more effective and efficient method of forming assembled side terminal batteries.

It is accordingly an object of the present invention to provide a more effective and efficient means of charging side terminal batteries.

More specifically, it is an object of this invention to provide a side terminal designed to readily receive a lead for charging without the use of a threaded fastener or adapter.

Yet another object of this invention is to provide an intimate connection between the side terminal and the lead during battery formation.

A still further object of this invention is to reduce manufacturing costs associated with the production of side terminal batteries.

These and other objects will be apparent from the following description and drawings.

SUMMARY OF THE INVENTION

In accordance with the present invention, side terminal SLI batteries are provided which have a terminal configuration designed to readily receive charging leads. The battery terminal configuration and the charging cable lead utilize complementary configurations which interlock and provide an intimate and reliable connection between the terminal and lead.

In this fashion, formation of these side terminal batteries can be accomplished without the use of an adapter while allowing formation to be effectively carried out.

In general, an interlocking connection is formed by utilizing a charging equipment having two, preferably parallel, legs which slide into slots formed in the terminal wall or collar.

Such interlocking side terminal-lead connections eliminate the need of threadingly engaging and disengaging fasteners or adapters during formation while providing a relatively electrically efficient formation process to be carried out.

BRIEF DESCRIPTION OF THE DRAWINGS

FIG. 3 is a perspective view of a prior art lead and cable used for charging;

FIG. 4 is a perspective view of a prior art adapter, lead and cable used for charging;

FIG. 5 is a perspective partial cut-away view of a side terminal battery utilizing one embodiment of a terminal configuration in accordance with the present invention;

FIG. 6 is a perspective view of a charging equipment lead made in accordance with the present invention;

FIG. 7 is a cross-sectional view taken along a horizontal plane through the center of the terminal illustrating the terminal and lead shown in FIGS. 5 and 6 respectively in an interlocked position;

FIG. 8 is a perspective partial cut-away view of a side terminal battery according to this invention and illustrating another embodiment of a side terminal configuration;

FIG. 9 is a perspective view of a charging equipment lead adapted for use with the side terminal illustrated in FIG. 8; and FIG. 10 is a view similar to FIG. 7 and illustrating a side terminal of the battery of FIG. 8 interlocked with the lead of FIG. 9.

DETAILED DESCRIPTION OF THE DRAWINGS

Figure 1:
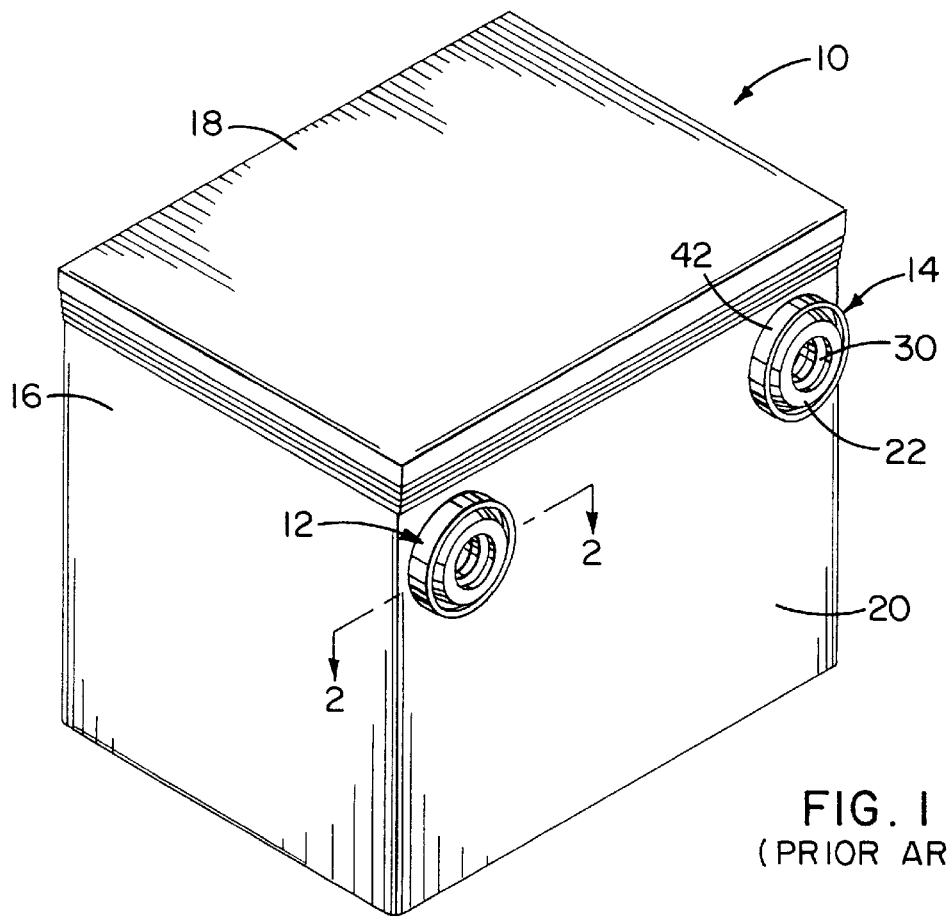
FIG. 1 is a perspective view of a conventional side terminal battery.

While the invention is susceptible to various modifications and alternative constructions, certain illustrative embodiments thereof have been shown in the drawings and will be described in detail below. It should be understood, however, that there is no intention to limit the invention to the specific configurations disclosed, but rather, the invention is to cover all modifications, alternative constructions and equivalents falling within the spirit and scope of the invention. It will be appreciated that the present invention may be used with any battery that presently requires a threaded fastener or adapter to engage the threaded cavity of the terminal for purposes of battery charging. Thus, while the present invention will be principally described in connection with the initial charging or formation of the battery, it should be appreciated that this invention similarly facilitates charging of the battery thereafter, whether before or during service.

Additionally, the design of the internal components of the batteries of the type discussed below are known; and the particular design does not form a part of the present invention. Similarly, the particular configuration of the side terminal may be varied as desired, consistent with the objectives of this invention.

Figure 2:
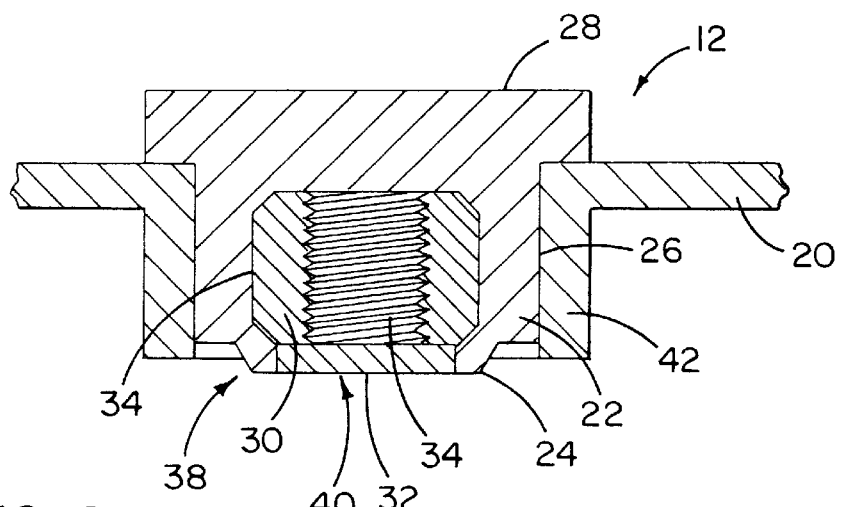
FIG. 2 is a cross-sectional view taken generally along the line 2—2 in FIG. 1.

Referring now to the drawings, FIG. 1 illustrates a conventional side terminal battery 10 having side terminals 12, 14, a container 16, a cover 18, and a front side wall 20. The battery container 16 and cover 18 may be molded from any pre-selected plastic material, such as convention ethylene-propylene copolymers typically used for battery containers. For each side terminal 12, 14, the front side wall 20 provides a cavity through which the side terminals 12, 14 extend. As best seen in FIG. 2, a substantially cylindrical terminal body 22 formed of a relatively ductile, electrically conductive, corrosion resistant material is disposed within the side terminal 12. Typically, the terminal body 22 is formed of lead or a lead alloy, as is known, and is molded or mechanically installed within the battery container 16 so as to form a seal and prevent leakage of battery electrolyte through or around the terminal 12. The terminal body 22 protrudes through the battery front side wall 20 whereby the terminal body face 24 provides a surface for external electrical contact. Internal electrical connections are made from the back of the terminal body 28 to the battery cell by an appropriate means, as is known in the art.

Embedded within the terminal body 22 is an electrically conductive insert 30, as is known, thus creating a terminal body and insert assembly 38. The face 32 and the internal cavity 34 of the insert 30 are externally exposed through the side terminal 12. The face 24 of the terminal body 22 and the face 32 of the insert form the terminal face 40.

It is prior practice to thread the internal cavity 34 of the insert 30 so as to engage complementary threads of a battery lead fastener 50 or adapter 60, as seen in FIGS. 3 and 4. Both the outer surface 26 of the terminal body 22 and the outer surface 34 of the insert 30 may be contoured so as to prevent rotation within the terminal 12 during engagement and disengagement of a lead fastener 50. For example, ribs or protrusions circumferentially spaced around the outer surface 26 of the terminal body 22 and/or the outer surface 34 of the insert 30 which extend parallel to the longitudinal axis provide resistance from rotation. The insert 30 is preferably formed of a corrosion resistant, electrically conductive, relatively non-ductile material such as stainless steel.

The terminal body and insert assembly 38 extend beyond the vertical plane of the battery's front side wall 20. The battery container 16 provides a radial wall 42 that extends outwardly from the front side wall 20 and encompasses the terminal body and insert assembly 38. Presently, the terminal face 40 provides the only exposed surface through which an external electrical connection may be made. A cable 52, as illustrated in FIG. 3, is connected to the side terminal 12, 14 through a lead 54 which houses a threaded fastener 50. The threaded fastener 50 engages the inner threaded cavity 34 of the insert 30 and ultimately creates intimate contact between the lead 54 and the terminal face 40. Consequently, anytime a cable 52 is connected to the battery terminal 12, 14, whether it be for charging, forming, or operational use within a vehicle, the fastener 50 must be threaded into the side terminal 12, 14 to provide the intimate contact necessary between the lead 54 and terminal face 40 to support an electrical connection. Accordingly, if the circumstances dictate removal of the cables 52 from the side terminals 12, 14, the threaded fastener 52 must be removed from the side terminal 12, 14. When connecting cables 52 to a side terminal battery 10 for operation within a vehicle, the threaded fastener 54 provides a secure intimate connection with the terminal 12, 14 which is both reliable and effective. However, a threaded connection between the lead and terminal is not always desirable.

During the production of lead-acid SLI batteries 10, it is necessary to form or charge each battery, as is conventional and known, to convert the unformed active material of the battery plates into the desired lead-acid positive and negative active material. Cables 52 are attached to the battery terminals 12, 14 and provide current to the battery 10 through the battery terminals 12, 14, thus charging the electrode cells.

As seen in FIG. 4, the charging cables 52 typically employ a post clamp lead 58 for use with traditional top terminal batteries. Since the introduction of side terminal batteries 10, adapters 60 are commonly used to permit charging with the traditional post clamp lead 58. The adapters 60 frequently employ a threaded shaft 62 on one end to engage the insert 30 of the side terminal 12, 14 and a post terminal connection 64 on the opposite end to correspond with the post clamp lead 58. After threading the adapters 60 into the side terminals 12, 14, the standard battery charging cables having post clamp leads 58 may be utilized. Adaptation of the side terminals 12, 14 requires threading into each battery's side terminal 12, 14 an adapter 60 which must be subsequently removed after charging. It should be further noted that during production the post clamp lead 58 is traditionally placed over the tapered post terminal adapter 64 to create an interference or friction fit. The resulting electrical connection between the post terminal adapter 60 and the post clamp lead 58 is often loose and results in a high resistance connection that may melt and distort the terminal face 40 and/or loosen the insert 30. In addition, the insert 30 is sometimes loose and may prevent an intimate charging connection.

Alternatively, the use of traditional side terminal leads 54 illustrated in FIG. 2 will require the same labor-intensive procedure described above, where threading engagement and disengagement is necessary for each lead connection. Use of either the threaded fastener 50 or the adapter 60 is similarly inefficient and costly from a production standpoint. Similarly, the resulting electrical connection may be loose and result in a high resistance connection that may melt and distort the terminal face 40 and/or loosen the insert 30.

Pursuant to the present invention, a method of charging a lead-acid SLI battery 10 is provided which utilizes a side terminal battery having a side terminal configured to accept complementary configured charging equipment lead. More particularly, as illustrated in FIGS. 5–7, each battery terminal 70 is adapted to directly receive a charging cable lead 90 without the use of threaded fastener 50 or adapter 60.

The radial wall 42 extending outwardly from the front side wall 20 and encompassing the terminal body and insert assembly 38 provides a pair of diametrically opposed parallel slots 72, 74. The slots 72, 74 extend in a vertical direction and expose two diametrically opposed contact areas 76, 78 on the outer surface 26 of the terminal body 22. The slots 72, 74 are most conveniently formed in the radial wall 42 of the container 16 through molding operations, although it is conceivable that other techniques may be used to form the slots 72, 74. The slots 72, 74 are designed for use with a lead clip 90 as shown in FIG. 6.

The lead clip 90 includes a substantially "U"-shaped body 92 having two parallel legs 94, 96 adapted to slidingly engage the side terminal slots 72, 74. The perpendicular distance between inner surfaces 98, 100 of the two legs 94, 96 is substantially equivalent to the outer diameter of the terminal body 22. Shown in FIG. 7, upon sliding the clip 90 into side terminal slots 72, 74, a connection is formed between the inner surfaces 98, 100 of the clip legs 94, 96 and the respective contact areas 76, 78 of the terminal body 22. This connection provides the intimate contact necessary to support an electrical connection for charging the battery 10. The connection is achieved by simply sliding the clip 90 into the side terminal slots 72, 74, thus minimizing lead connection time and effort while providing a safe, reliable connection.

It will be appreciated that the side terminal slots 72, 74 may extend in any direction around the side terminal wall 42. Further, the side terminal slots 72, 74 and, consequently, the lead clip legs 94, 96 may incorporate a variety of configurations so as to effectuate an electrical connection. For example, the interlocking connection may utilize only one slot which exposes an electrically conductive surface of the terminal. The electrical connection would therefore be provided between the clip leg and the electrically conductive terminal surface while the other leg would retain the clip in engagement with the terminal.

FIG. 8 illustrates an alternative embodiment of the present invention where the side terminal 110 incorporates diametrically opposed ears 112, 114 extending outwardly from the side terminal radial wall 42. The ears 112, 114 have rear surfaces 115, 116 and provide a locking mechanism for a twist-on lead 120 connection. Furthermore, the first ear 112 has a lower horizontal surface 117 and the second ear 114 has an upper horizontal surface 118.

FIGS. 9 and 10 depict a twist-on lead 120 having a "U"-shaped body 122 with two parallel legs 124, 126 and a face surface 160. The perpendicular distance between the two legs 124, 126 is substantially equal to the outer diameter of the terminal ears 112, 114. The parallel legs 124, 126 provide a first stop 128 and a second stop 130 where the lower surface of the first stop 128 is defined by the lower lead surface 134 while the top surface of the second stop 130 is defined by the upper lead surface 132. The stops 128, 130 extend the length of the inner surface of the legs 124, 126. The legs 124, 126 further provide two ear engaging surfaces 148, 150 and two opposing parallel surfaces 144, 146 which define an opening substantially equivalent to the outside diameter of the side terminal radial wall 42. The face surface 160 of the twist-on lead 120 is interposed between the parallel legs 124, 126 and extends toward the ear engaging surfaces 148, 150. The perpendicular distance between the face surface 160 and the ear engaging surfaces 148, 150 is substantially equal to the perpendicular distance between the rear surfaces 115, 116 of the terminal ears 112, 114 and the terminal face 40.

The twist-on lead 120 is interlocked with the side terminal ears 112, 114 by positioning the lead 120 such that the opening between the lead legs 124, 126 is facing the terminal face 40. Starting from a horizontal plane, the operator must rotate the lead 120 approximately 45° in the counterclockwise direction and subsequently insert the lead 120 over the side terminal radial wall 42 so that the radial wall 42 fits within the two opposing parallel surfaces 144, 146 of the lead legs 124, 126. The twist-on lead 120 is then rotated 45° in the clockwise direction, back to the horizontal plane whereby the first stop 128 rests upon the bottom surface 117 of the first ear 112 and the second stop 130 rests upon the top surface 118 of the second ear 114. The ear engaging surfaces 148, 150 of the lead 120 engage the back surfaces 115, 116 of the side terminal ears 112, 114 respectively and retain the face surface 160 of the lead 120 and the terminal face surface 40 in intimate contact. The face surfaces 40, 160 provide the electrical connection through which the battery 10 is ultimately charged. The resulting interlocking connection between the side terminal 110 and lead 120 is secure. After formation, the lead 120 may be removed from the side terminal 110 by simply rotating the lead 120 in the counterclockwise direction until the two components disengage. As with the lead clip 90, the twist-on lead 120 similarly provides a means of quickly and effectively obtaining a lead-terminal connection.

It will be appreciated that the side terminal ears 112, 114 may be provided at any location along the side terminal wall 42. Further, the side terminal ears 112, 114 and, consequently, the twist-on lead 120 may incorporate a variety of configurations so as to effectuate an electrical connection. For example, the interlocking connection does not necessitate two ears and may consequently utilize only one ear along the side terminal wall 42 in which case the lead 120 would take on a number of alternative designs.

The lead clip 90 and the twist-on lead 120 are preferably made of a conductive, yet durable, metal. Steel, copper or brass are illustrative examples of the materials suitable for lead construction. Moreover, the lead configurations may be formed through molding or machining operations as is generally known. To reduce the risk of electrical shock during battery charging, it may be desirable to coat the surfaces of the lead, other than those forming the electrical connection, with an insulating material such as plastic or rubber.

The present invention thus provides an efficient and effective means of charging batteries during production. The side terminal and lead configurations provide connections that are readily interlocked while retaining the lead and side terminal electrical contact surfaces in intimate contact during battery charging. The interlocking connection eliminates the labor intensive task of threadingly engaging and disengaging the lead or adapter to the side terminal, thus minimizing production costs.

I claim:

1. A lead-acid side terminal battery capable of forming an interlocking connection with leads of a charging equipment, said leads comprising an exposed, electrically conductive surface, the battery comprising:

a container having a front side wall, a cover sealed to said container, and a positive side terminal and a negative side terminal, each said side terminal located on said front side wall, each said side terminal having a radial surface, an exposed electrically conductive terminal surface, said exposed electrically conductive surface being other than an exposed surface of a bolt, the side terminal radial surface being configured to slidingly receive said lead to form an interlocking connection with said lead whereby the exposed, electrically conductive surface of the lead contacts the exposed electrically conductive terminal surface.

2. The battery of claim 1 wherein said radial surface of at least one said side terminal has at least one slot which exposes said electrically conductive terminal surface of said terminal, whereby said corresponding lead slidingly engages said terminal slot and contacts said exposed electrically conductive surface of said terminal.

3. The battery of claim 2 wherein said radial surface of said at least one said side terminal comprises two opposed parallel slots where each exposes said electrically conductive surface of said terminal and said lead comprises two legs adapted to slidingly engage said slots.

4. The battery of claim 1 wherein at least one said terminal has an electrically conductive face surface, said radial surface of said terminal comprising at least one ear projecting outwardly from said radial surface of said terminal and the corresponding lead has a face, whereby said lead slidingly engages said terminal ear and creates contact between said terminal face and said lead face.

5. The battery of claim 4 wherein said radial surface of said at least one said side terminal comprises two opposed ears and said lead comprises a twist-on lead having two legs and said lead face interposed between said legs, whereby said legs slidingly engage said ears.

6. A lead-acid side terminal battery capable of forming an interlocking connection with leads of a charging equipment, said leads comprising an exposed, electrically conductive surface, the battery comprising:

a container having a front side wall, a cover sealed to said container, and first and second side terminals, said first and second side terminals being located on said front side wall, said first and second side terminals each having a radial surface and an exposed electrically conductive terminal surface, said radial surface of at least one of said side terminals having at least one slot which exposes said electrically conductive terminal surface of said at least one terminal, the side terminal radial surface of the first and the second side terminals being configured to slidingly receive said lead to form an interlocking connection with said lead whereby the exposed, electrically conductive surface of the lead contacts the exposed electrically conductive terminal surface.

7. The battery of claim 6 wherein said radial surface of said at least one said side terminal comprises two opposed parallel slots where each exposes said electrically conductive surface of said terminal and said lead comprises two legs adapted to slidingly engage said slots.

8. A lead-acid side terminal battery capable of forming an interlocking connection with leads of a charging equipment, said leads comprising an exposed, electrically conductive surface, the battery comprising:

a container having a front side wall, a cover sealed to said container, and first and second side terminals, said first and second side terminals being located on said front side wall, said first and second side terminals each having a radial surface and an exposed electrically conductive terminal surface, the electrically conductive terminal surface of at least one said side terminal comprising an electrically conductive face, the side terminal radial surface being configured to slidingly receive said lead to form an interlocking connection with said lead whereby the exposed, electrically conductive surface of the lead contacts the exposed electrically conductive terminal surface, said radial surface of said at least one said side terminal comprising at least one ear projecting outwardly from said radial surface of said at least one said side terminal and the electrically conductive surface of the corresponding lead is a face, whereby said lead slidingly engages said terminal ear and creates contact between said terminal face and said lead face.

9. The battery of claim 8 wherein said radial surface of said at least one side terminal comprises two opposed ears and said lead comprises a twist-on lead having two legs and said lead face interposed between said legs, whereby said legs slidingly engage said ears.

10. A method of electrically forming or charging a lead-acid side terminal battery having a positive side terminal and a negative side terminal using a charging equipment with leads, said terminals having radial terminal walls, the method comprising the steps of:

sliding a first said lead substantially adjacent the radial wall of the positive terminal with an exposed electrically conductive surface of the first said lead in direct contact with an exposed electrically conductive surface of the positive terminal, said exposed electrically conductive surface being other than an exposed surface of a bolt, engaging the first said lead with the positive terminal to form an interlocking connection between said first lead and the positive terminal, sliding a second said lead substantially adjacent the radial wall of the negative terminal with an exposed electrically conductive surface of the second said lead in direct contact with an exposed electrically conductive surface of the negative terminal, engaging the second said lead with the negative terminal to form an interlocking connection between said second lead and the negative terminal, supplying current through said leads directly to said terminals, and disconnecting said interlocking terminal and lead connections upon completion of charging.

11. The method of claim 10 further comprising the step of providing at least one said radial terminal wall with at least one slot which exposes said electrically conductive surface of said terminal, and said corresponding engaging step comprises engaging the respective lead with said terminal slot contacting said exposed electrically conductive surface of said terminal.

12. The method of claim 11 wherein said providing step comprises providing said at least one said radial terminal wall with two opposed parallel slots where each exposes an electrically conductive surface of said terminal and providing said lead with two legs, and said corresponding engaging step comprises engaging said legs with said slots.

13. The method of claim 10 further comprising the step of providing at least one said radial terminal wall with at least one ear projecting outwardly from said radial terminal wall, and said corresponding engaging step comprises engaging the respective lead with said terminal ear and creating contact between a corresponding terminal face and said lead.

14. The method of claim 13 wherein said providing step comprises providing at least one said radial terminal wall with two opposed ears and said lead with a twist-on lead having two legs and said face interposed between said legs, and said corresponding engaging step comprises engaging said legs with said ears.

15. A method of electrically forming or charging a lead-acid side terminal battery having first and second side terminals using a charging equipment with leads, said terminals having radial terminal walls, the method comprising the steps of:

providing the radial wall of at least one said side terminal with at least one slot which exposes an electrically conductive surface of said terminal, sliding a first said lead substantially adjacent the radial wall of the first side terminal with an exposed electrically conductive surface of the first lead in direct contact with said exposed electrically conductive surface of the first side terminal engaging the said first lead with said terminal slot to form an interlocking connection between the first lead and the first side terminal, sliding a second said lead substantially adjacent the radial wall of the second side terminal with an exposed electrically conductive surface of the second lead in direct contact with an exposed electrically conductive surface of the second side terminal, engaging the second lead with the second side terminal to form an interlocking connection between said second lead and the second terminal, supplying current through said leads directly to said terminals, and disconnecting said interlocking terminal and lead connections upon completion of charging.

16. The method of claim 13 wherein said providing step comprises providing said at least one said radial terminal wall with two opposed parallel slots where each exposes an electrically conductive surface of said terminal and providing said lead with two legs, and said corresponding engaging step comprises engaging said legs with said slots.

17. A method of electrically forming or charging a lead-acid side terminal battery having first and second side terminals using a charging equipment with leads, said terminals having radial terminal walls, the method comprising the steps of:

providing at the radial terminal wall of the first side terminal with at least one ear projecting outwardly from said radial wall of the first terminal, sliding a first said lead substantially adjacent the radial wall of the first terminal with an exposed electrically conductive surface of the first lead in direct contact with an exposed electrically conductive surface of the first terminal, engaging the first lead with said terminal ear of the first terminal to form an interlocking connection between said first lead and the first terminal, and creating contact between a first terminal face and said first lead, sliding a second said lead substantially adjacent the radial wall of the second terminal with an exposed electrically conductive surface of the second lead in direct contact with an exposed electrically conductive surface of the second terminal engaging the second lead with the second terminal to form an interlocking connection between said second lead and the second terminal, supplying current through said leads directly to said terminals, and disconnecting said interlocking terminal and lead connections upon completion of charging.

18. The method of claim 16 wherein said providing step comprises providing at least one said radial terminal wall with two opposed ears and said lead with a twist-on lead having two legs and said face interposed between said legs, and said corresponding engaging step comprises engaging said legs with said ears.

* * * * *

UNITED STATES PATENT AND TRADEMARK OFFICE
CERTIFICATE OF CORRECTION

PATENT NO.   : 6,025,088
    DATED    : February 15, 2000
    INVENTOR(S) : Kump It is certified that errors appear in the above-identified patent and that said Letters Patent is hereby corrected as shown below:

ON THE TITLE PAGE:

[56] References Cited, Line 1: "2,132,793  11/1938" should read --2,132,793  6/1934--

IN THE CLAIMS:

In Claim 15, Column 9, Line 18: "terminal" should read --terminal,--.

In Claim 16, Column 9, Line 34: "13" should read --15--.

In Claim 17, Column 10, Line 25: "terminal" should read --terminal,--.

In Claim 17, Column 10, Line 30: "disconnecting" should begin on a new line.

Signed and Sealed this

Twenty-fourth Day of April, 2001

*Attest:*

NICHOLAS P. GODICI

*Attesting Officer*   *Acting Director of the United States Patent and Trademark Office*